United States Patent [19]
Friedrich

[11] Patent Number: 5,375,155
[45] Date of Patent: Dec. 20, 1994

[54] FUEL ASSEMBLY WITH RATIONAL SCREW FASTENINGS OF THE UPPER TIE PLATE TO TUBES OR RODS

[75] Inventor: Erhard Friedrich, Eckental, Germany

[73] Assignee: Siemens Aktiengesellschaft, Munich, Germany

[21] Appl. No.: 91,614

[22] Filed: Jul. 14, 1993

[30] Foreign Application Priority Data

Jul. 14, 1992 [EP] European Pat. Off. ............ 92111997

[51] Int. Cl.$^5$ ................................................. G21C 3/32
[52] U.S. Cl. ........................................ 376/446; 376/353
[58] Field of Search ............... 376/353, 327, 364, 449, 376/446; 976/DIG. 63, DIG. 116

[56] References Cited

U.S. PATENT DOCUMENTS

| | | | |
|---|---|---|---|
| 3,864,211 | 2/1975 | King et al. | 376/440 |
| 4,030,975 | 6/1977 | Anthony et al. | 376/442 |
| 4,064,004 | 12/1977 | Long et al. | 376/440 |
| 4,219,386 | 8/1980 | Osborne et al. | 376/434 |
| 4,522,782 | 6/1985 | Leclercq | 376/438 |
| 4,937,039 | 6/1990 | Balog | 376/353 |
| 5,267,286 | 11/1993 | Hirukawa | 376/353 |

FOREIGN PATENT DOCUMENTS

| | | |
|---|---|---|
| 0110090 | 6/1984 | European Pat. Off. . |
| 2493024 | 4/1982 | France . |
| 2539548 | 7/1984 | France . |
| 9205565 | 4/1992 | WIPO . |

Primary Examiner—Donald P. Walsh
Assistant Examiner—Meena Chelliah
Attorney, Agent, or Firm—Herbert L. Lerner; Laurence A. Greenberg

[57] ABSTRACT

A pressurized water reactor fuel assembly includes a can with a flange engaging an upper surface of an upper tie plate through a bore and carrying a collar projecting beyond a lower surface of the upper tie plate and having an external thread. A bush at an upper end of a guide tube has an internal thread and an end surface which abuts the lower surface of the upper tie plate. A profile at the periphery of the bush engages a corresponding counter profile of the lower surface of the upper tie plate. This removable screw connection, which is also suitable for coolant tubes of boiling-water fuel assemblies, requires little of the cross-sectional area required for coolant bores and no individual tolerance equalization of the screw connections of an individual plate.

13 Claims, 5 Drawing Sheets

FUEL ASSEMBLY WITH RATIONAL SCREW FASTENINGS OF THE UPPER TIE PLATE TO TUBES OR RODS

BACKGROUND OF THE INVENTION

FIELD OF THE INVENTION

The invention relates to a fuel assembly of a pressurized water reactor, having a lower tie plate being permeable to coolant; an upper tie plate with an upper surface, a practically flat lower surface, and coolant openings; a bundle of fuel rods located next to one another, extending practically from the lower tie plate up to the upper tie plate; and a plurality of control rod guide rods, each having one bush on its upper end, being screwed to a can inserted into a retaining bore in the upper tie plate. The invention also relates to a fuel assembly of a light water reactor, having an end plate on one end being permeable to coolant; a cover plate on the other end, having an outer surface pointing outward, an inner surface pointing toward the fuel assembly interior, coolant openings, and at one retaining bore; a bundle of tubes being located next to one another with the majority of the tubes containing fuel; and at least one bush lengthening the end of a tube and being retained on the cover plate.

Fuel assemblies of pressurized water reactors include a lower tie plate that is permeable to the coolant, an upper tie plate with coolant openings, and a bundle or cluster of fuel rods located next to one another, with the cluster extending practically from the lower tie plate to the upper tie plate. Several of the regularly disposed fuel rod positions in the cluster are not occupied by fuel rods but rather by control rod guide tubes to which the lower tie plate and upper tie plate are secured, so that these plates form a stop for the fuel rods, which are guided through the holes in a plurality of gridlike spacers secured to the guide rods and are supported on grid ribs of the spacers. The guide rods are secured to the lower tie plate, for instance because the lower ends of the guide rods have threaded bolts that are passed through remaining bores in the lower tie plates and are screwed from below through nuts on the lower tie plate.

The invention pertains in particular to the fastening of the upper tie plate to the guide rods, for which purpose welded connections are unsuitable as a rule. This is because, although the upper tie plate is often made of austenitic steel, in modern pressurized water reactors, for the sake of neutron economy, guide rods of a zirconium alloy are used as a rule. Moreover, it is often necessary for purposes of inspection and repair to remove the upper tie plate and take out individual fuel rods from the fuel assembly. Releaseable connections are therefore desirable, yet they should include as few components as possible and the components should be secured against falling out.

Such screw fastenings often include one bush each, which is mounted (welded, for instance) to the upper end of the guide rod and screwed to a can that is inserted into a retaining bore in the upper tie plate and secured there.

In known screw fastenings, the bush of the guide rod has an internal thread for being screwed to the can inserted into the retaining bore of the upper tie plate and has a polygonal outside cross section, with which the bush protrudes into a corresponding polygonal recess on the lower surface of the upper tie plate, so that it can absorb the torque occurring when the bush is screwed to the can. The can is turned by its external thread far enough into the internal thread of the guide rod bush that an edge of the can, being formed as stop, comes to rest on the top of the upper tie plate, and by means of deformation the can rim can be pressed into a suitable profile on the top of the upper tie plate to secure the can against twisting and against unintentional loosening.

The polygonal recesses on the lower surface of the upper tie plate are complicated and expensive to produce, and they require a considerable minimum spacing on the part of the coolant openings in the upper tie plate, where the least possible pressure loss should occur, from the retaining bores that carry the can.

Moreover, for the length of the guide rods and the polygonal recesses on the lower surface of the upper tie plate, variations dictated by production requirements are unavoidable. It therefore may occur that when the cans are screwed together with the bushes, some guide rod bushes will be tightened until they meet the recesses of the upper tie plate, while the screw fastenings of other guide rod bushes have not been tightened up to a stop. All of the forces occurring between the guide rods and the upper tie plate are then absorbed only by the few screw fastenings that have been tightened up to a stop, while the other screw fastenings are seated loosely. That reduces the strength of the fuel assembly, and the heavily loaded screw fastenings can break. Moreover, there is no assurance that the upper tie plate will be aligned perpendicularly to the axis of the guide rods.

Provision is therefore made, in that known construction, not to weld the individual guide rods together with their bushes until the bushes have been turned into place and the upper tie plate has been aligned. When welding is then done, individually occurring deviations from standard dimensions can be compensated for. Therefore each upper tie plate is individually adapted to the individual fuel assembly, and in inspection work care must accordingly always be taken not to mistake the upper tie plates belonging to the various assemblies for one another. Moreover, care must even be taken to ensure that the same cans of the same upper tie plate will always be screwed together with the same bushes of the guide rods. This requires special monitoring in repair work.

In order to retain the guide rods on the lower tie plate of a pressurized water reactor as well, or to fasten fuel rods (particularly so-called "carrying rods" or "tie fuel rods", which are screwed to both the head and foot of the fuel assembly) and other tubes to a tie plate, a mechanically stable screw fastening is often sought that is easy to mount and easy to release, that includes only a few parts, which are prevented from falling out as much as possible, and which affords sufficient space for many and/or large coolant openings in the tie plate.

Accordingly, the invention provides—in a more generalized way—for retaining a tube on a cover plate which is located on one end of the fuel assembly and covers the bundle of fuel rods. This cover plate has an "inner surface" pointing toward the fuel rods, and an opposite "outer surface". A plate which covers that bundle at the opposite end of the assembly may be called "end plate". In the above mentioned case the tube is a control rod guide tube and is fastened on the upper tie plate; the "cover plate" and its "inner surface" stands for the upper tie plate and its lower surface, but in the more general case, the tube may be the cladding of a fuel rod, too. Additionally, the "cover plate" may also stand for the lower tie plate. In this case, the inner and outer surface of this cover plate is its upper and lower surface, respectively.

Published International Application WO 92/05565, corresponding to U.S. application Ser. No. 08/033,590, describes a boiling water fuel assembly with an end plate being permeable to coolant on one end (head), and a cover plate with coolant openings having an outside pointing outward and an inside pointing toward the interior of the fuel assembly. In that case, the two plates cover the two open ends of a fuel assembly case laterally surrounding a cluster of rods.

The rod bundle or cluster of said known fuel assembly includes tubes located next to one another, and the majority of the tubes contain fuel or in other words are fuel rods. At least one of the tubes is lengthened on one end by a bush that is retained on the lower tie plate ("cover plate"). This one tube is constructed as a coolant tube.

In other words, it carries liquid coolant from the foot into the upper part of the fuel assembly. Its bush has an external thread with which it is screwed into a retaining bore in said lower tie plate. A bolt is passed through the tie plate and the bush, and after assembly is welded to one of the parts and secures the screw fastening of the bush against twisting.

In order to release the screw fastening, the bolt must be destroyed, for instance by being drilled out or severed.

In the case of other tubes, such as fuel rods, that are held to the lower tie plate (cover plate), by one end, but extend over only a portion of the fuel assembly (known as "partial-length fuel rods"), bayonet mounts are provided for fastening purposes.

In order to fasten such coolant tubes and partial-length fuel rods as well, a screw fastening that is as rational, space-saving and stable as possible and that can be released only from the outside with a suitable tool, is advantageous.

SUMMARY OF THE INVENTION

It is accordingly an object of the invention to provide a fuel assembly with a rational screw fastening of the upper tie plate of the fuel assemblies to tubes or rods (fuel rods, guide rods), which overcomes the hereinafore-mentioned disadvantages of the heretofore-known devices of this general type. With the foregoing and other objects in view there is provided, in accordance with the invention, a fuel assembly of a pressurized water reactor, comprising a lower tie plate being permeable to coolant; an upper tie plate having an upper surface, having a practically flat lower surface, and having coolant openings formed in the upper tie plate; a bundle of fuel rods being disposed next to one another and extending substantially from the lower tie plate to the upper tie plate; and a plurality of control rod guide tubes each having an upper end, a bush on the upper end, and a can being inserted into a retaining bore in the upper tie plate and being screwed to the bush; the bush having an end surface forming a flat bearing surface striking the lower surface of the upper tie plate, a profile engaging a counterpart profile of the upper tie plate in a manner secure against twisting, and an internal thread; and the can having a flange fitting over the upper surface of the upper tie plate, and a collar protruding beyond the lower surface, the collar having an external thread being screwed into the internal thread of the bush, until the flange strikes the upper surface of the upper tie plate.

In accordance with another feature of the invention, the can has an upper part facing away from a fuel rod, the upper part having an inner surface forming engagement surfaces for a turning tool.

In accordance with a further feature of the invention, the can and the retaining bore are cylindrical and are surrounded by coolant bores formed in the upper tie plate, the flange fitting over the upper surface of the upper tie plate engages a retaining profile, and the retaining profile is preferably at least one of the adjacent coolant bores formed in the upper tie plate.

In accordance with an added feature of the invention, the bush is cylindrical, and the profile is formed by at least one upwardly protruding protrusion engaging a groove formed on the lower surface of the upper tie plate.

In accordance with an additional feature of the invention, the upper tie plate has a groove formed therein joining two of the coolant bores disposed on both sides of the retaining bore.

In accordance with yet another feature of the invention, the bush and the guide tube are formed of a zirconium alloy and are welded together with the bearing surfaces of the bushes of all of the guide tubes of one fuel assembly being disposed in a plane being as perpendicular as possible to the fuel rods.

In accordance with yet a further feature of the invention, the upper tie plate is formed of austenitic steel.

Accordingly, in a pressurized water fuel assembly, the bush that represents the upper end of the guide rod has an end surface, which forms a flat bearing surface striking the lower surface of the upper tie plate. The guide rod bush accordingly does not protrude into a recess of the upper tie plate, in the mounted state, but rather rests with the upper rim of the bush firmly against the lower surface of the upper tie plate. However, it is not necessary for the entire upper rim of the bush to be firmly in contact with the lower surface of the upper tie plate in this way. Instead, it may have a profile at one point of the periphery of the bush that engages a corresponding counterpart profile in the upper tie plate and secures the bush against twisting relative to the upper tie plate. The axial position of the guide rod is thus fixed by the play-free contact of the end surface with the lower surface of the upper tie plate, so that axial forces are transmitted uniformly. Conversely, torsional forces arising during the screwing process are absorbed by a slight play between the bush profile and the counterpart profile of the upper tie plate.

The bush also has an internal thread, into which an outer thread of the can inserted through a retaining bore in the upper tie plate is screwed.

The can itself has a flange fitting over the top of the upper tie plate, by which it is held on the upper tie plate, and a collar, which carries the external thread and protrudes past the lower surface. Through the use of this external thread, it is screwed onto the internal thread of the bush far enough so that the flange strikes the top of the upper tie plate.

Similar screw fastenings may also be used to retain other tubes on one of the upper tie plates of a fuel assembly.

Therefore, with the objects of the invention in view, there is also provided a fuel assembly for a light water reactor, comprising an tie plate ("end plate") at one end being permeable to coolant; another tie plate ("cover plate") at another end having a lower surface pointing outward ("outer surface"), an upper surface pointing toward an interior of the fuel assembly ("inner surface"), coolant openings formed in the lower tie plate, at least one retaining bore formed in the cover plate, and a counterpart profile; a bundle of tubes being disposed next to one another and having ends, a majority of the tubes containing fuel; at least one bush lengthening the end of one of the tubes and being retained on the cover plate; the bush having an end surface forming a bearing surface disposed on the inner surface of the cover plate, a profile striking the counterpart profile on the cover plate when the bush is turned, and an internal thread; and a pin reaching through the retaining bore, the pin having a flange resting on the outer surface of the cover tie plate and an end protruding beyond the inner surface of the cover plate, the end having an external thread screwed into the internal thread of the bush until the flange strikes the outer surface of the cover plate and the end surface of the bush strikes the inner surface of the cover plate.

In accordance with another feature of the invention, the flange has engagement surfaces for a turning tool.

In accordance with a further feature of the invention, the pin is constructed as a can.

In accordance with a concomitant feature of the invention, there is provided a retaining profile engaged by the flange, preferably a coolant opening formed in the cover plate adjacent the retaining bore.

Other features which are considered as characteristic for the invention are set forth in the appended claims.

FIGS. 1 to 7 show only specific embodiments of the invention which is not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
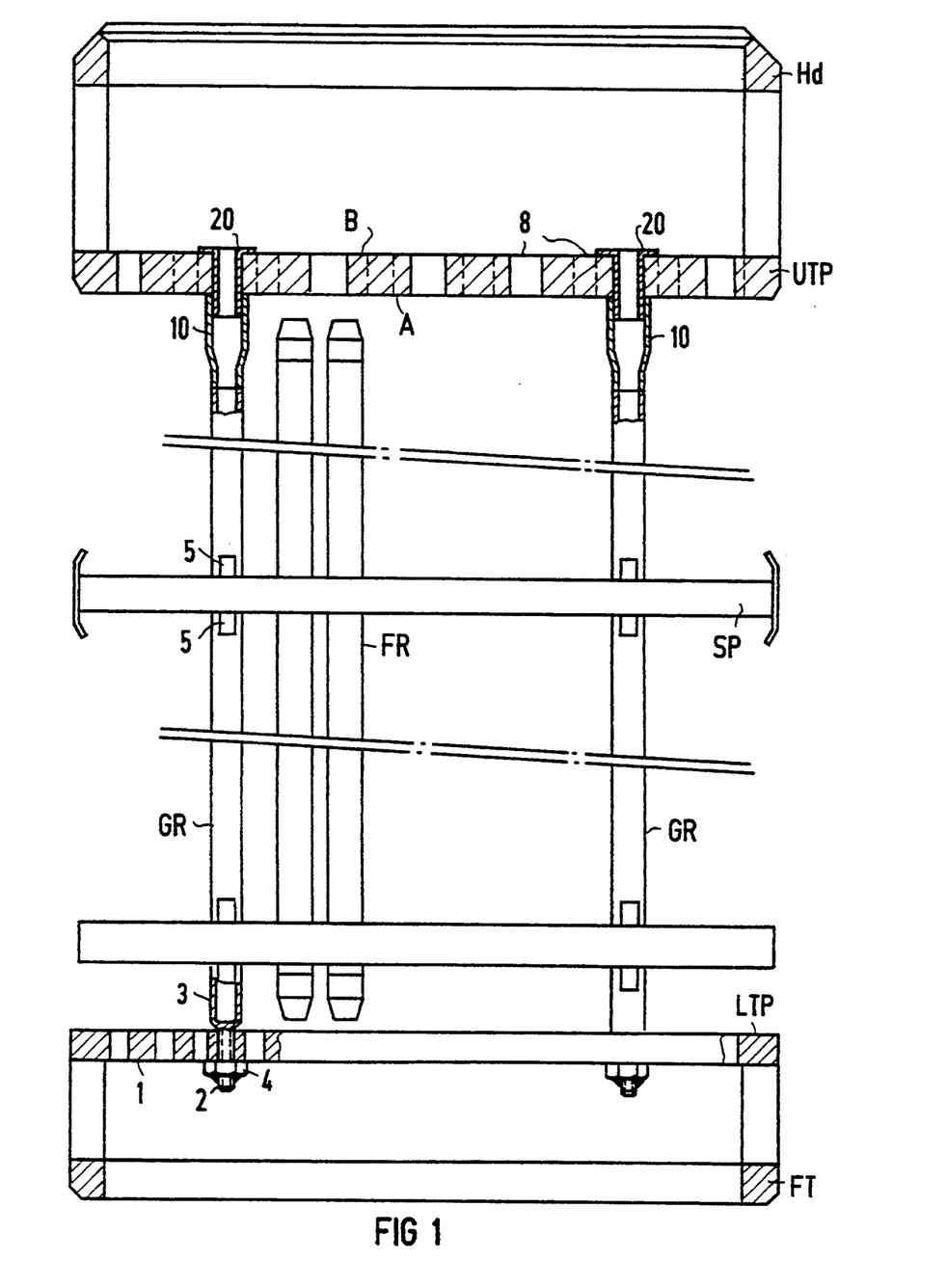
FIG. 1 is a diagrammatic, partly side-elevational and partly longitudinal-sectional view illustrating the principle of the fuel assembly according to the invention.

Referring now to the figures of the drawing in detail and first, particularly, to FIG. 1 thereof, there is seen a frame of a foot FT that carries a lower tie plate LTP, which is provided with coolant inlet openings 1 and on which threaded bolts 2, which are formed onto closure caps 3 of "guide rods" GR (i.e. guide tubes for control rods), are secured by means of nuts 4. Stops 5 secure gridlike spacers SP at a plurality of axial positions on the guide rods GR, and ribs of these spacers form holes or meshes through which fuel rods FR are guided, in order to support the rods by means of knobs and/or springs on the spacer ribs.

Upper ends of the guide rods GR have welded-on bushes 10 with an internal thread into which external threads of cans 20 are screwed. These cans 20 are seated in retaining bores in an upper tie plate UTP, which is held by a frame of a head HD and have flow openings 8 for coolant which are as numerous and as large as possible.

Figure 2:
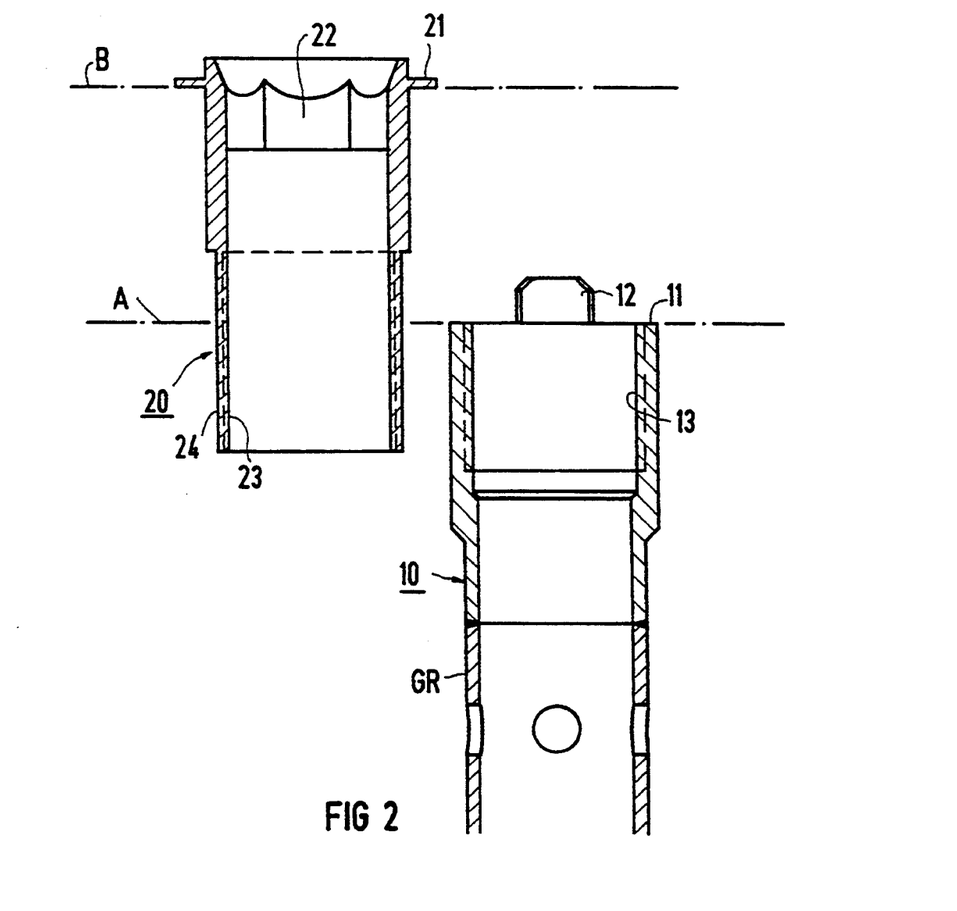
FIG. 2 is an enlarged, fragmentary, longitudinal-sectional view of a can and a bush, which are shown next to one another but in their axial position relative to an upper tie plate for the sake of easier comprehension.

In FIG. 2, dot-dash lines indicate a plane in which a lower surface A of the upper tie plate UTP is located and a plane in which an upper surface B of the upper tie plate is located.

The guide rod GR has the welded-on bush 10, which is cylindrical and thus has a flat end surface 11. This end surface rests practically without play on the lower surface A of the upper tie plate. It is only at one point that a protrusion 12 protrudes outwardly beyond the end surface 11 past the lower surface A of the upper tie plate and into a groove in the upper tie plate, which is described below.

The bush and the control rod guide rod are advantageously made of a zirconium alloy and are welded together in such a way that the bearing surfaces (end surfaces 11) of all of the guide rod bushes of one fuel assembly are located in the same plane, which is as perpendicular as possible to the fuel rods. This manufacture and alignment of the cladding tubes and bushes is therefore independent of the individual dimensions of individual upper tie plates and can be done by means of a gauge, for instance. In repair work, the upper tie plates of individual fuel assemblies can therefore certainly be exchanged for one another.

The top of the can 20 facing away from the fuel rod cluster has a flange 21, which protrudes laterally outward and rests on the upper surface B of the upper tie plate. The inner surface of the can in this upper part forms flat engagement surfaces 22, which can be engaged by a turning tool for mounting the fuel assembly. With this turning tool, a collar 23 protruding downward beyond the lower surface A of the upper tie plate is screwed by its external thread 24 into an internal thread 13 of the bush 10.

Figure 3:
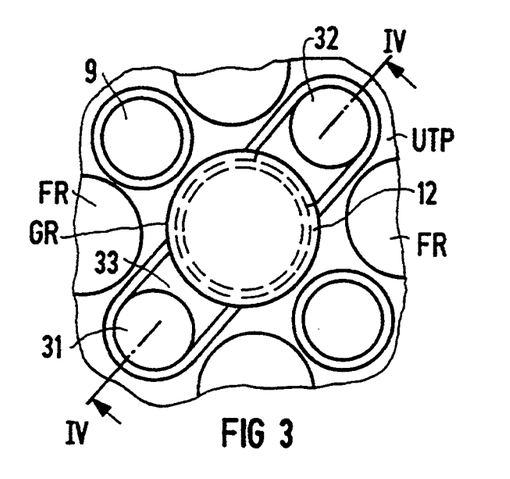
FIG. 3 is a fragmentary, bottom-plan view of a lower surface of the upper tie plate.

In FIG. 3, a position occupied by a guide rod GR can be seen between the positions of the fuel rods FR, and flow openings 9 are provided in the upper tie plate between these positions. The round retaining bore for the can 20 which is also round and is hidden by the guide rod GR in the plan view of FIG. 3, is accordingly surrounded by coolant bores, and two coolant bores 31, 32 on both sides of the retaining bore are joined by a groove 33. This groove made on the lower surface of the upper tie plate serves to receive the protrusion 12 shown in FIG. 2, which still has some slight tangential play, although it does not extend as far as the bottom of the groove 33. Reference symbols IV—IV indicate a sectional plane through the upper tie plate UTP made of austenitic steel, and in the corresponding sectional view of FIG. 4, a side view of the bush 10 and the can 20 that is not cut away is shown on the right.

Figure 4:
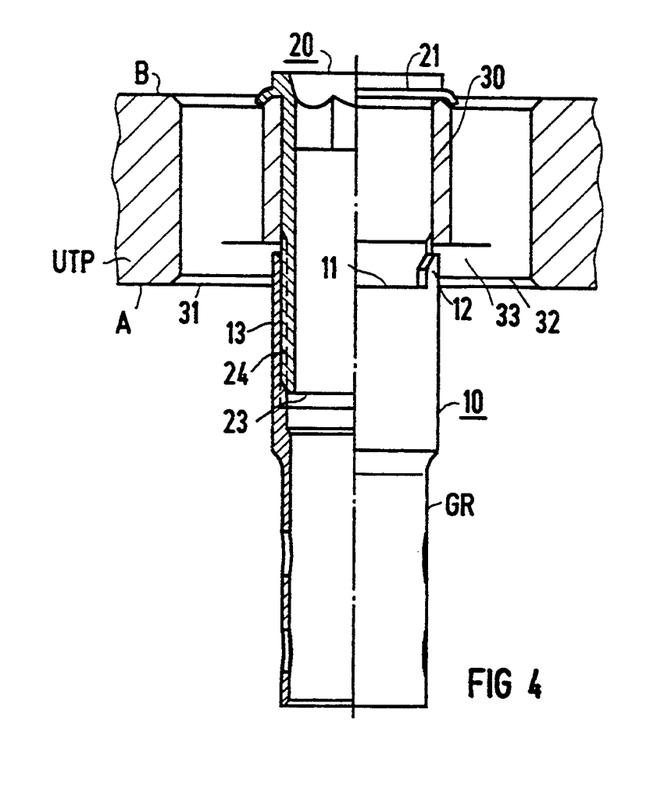
FIG. 4 is a fragmentary, longitudinal-sectional view of a finished screw fastening.

It can be seen that the flange 21 fitting over the upper surface B of the upper tie plate is curved or bent after mounting of the fuel assembly in such a way that it engages a corresponding retaining profile on the upper surface B of the upper tie plate. In the very compact three-dimensional configuration shown herein, the flange 21 engages the coolant bores 31, 32 adjacent to the retaining bore 30.

In order to mount the fuel assembly, the can 20 is screwed into the bush 10 and tightened with a constant torque (such as 10 Nm), which is absorbed by the protrusion 12. Then the rim of the flange is pressed into the coolant bore. This secures the can. For disassembly, it suffices to break this rotational fastening with some torque (such as 200 Nm).

In this way, a very compact configuration is created, in which there is sufficient space for coolant bores, which can extend as far as the vicinity of the retaining bore 30. As compared with the screw fastenings explained at the outset, in which the guide rod bush, with an octagonal profile, engages corresponding recesses on the lower surface of the upper tie plate, in this case without any loss in mechanical stability of the upper tie plate, approximately 9 cm$^2$ of additional flow area for the coolant is created, and as a result the pressure loss in the coolant flow that occurs at the upper tie plate is reduced. All of the guide rod bushes rest with the predominant portion of their end surface on the lower surface of the upper tie plate, and the forces occurring in the fuel assembly are therefore distributed uniformly over the entire upper tie plate. The upper tie plate itself is aligned perpendicularly to the longitudinal axis of the fuel rods in such a manner as to be especially easy for assembly and disassembly, without any individual adaptation among the cans, bushes and retaining bores.

Figure 5:
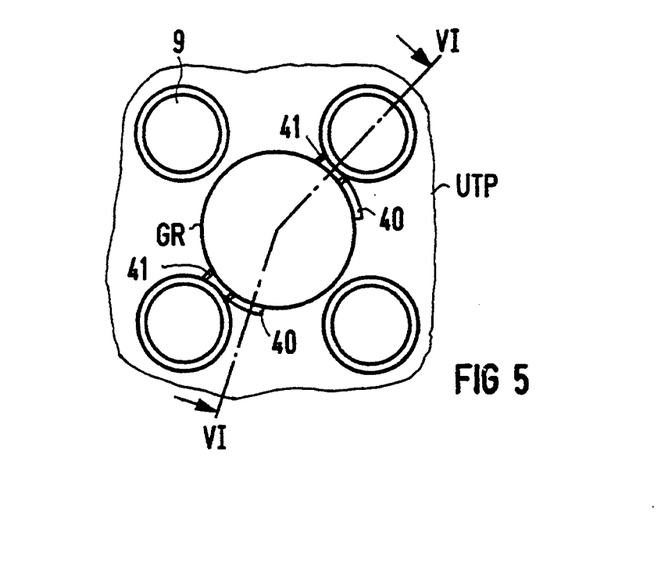
FIGS. 5 and 6 are views corresponding to FIGS. 4 and 5 of a different exemplary embodiment.

In the exemplary embodiment of FIG. 5, the bush of the guide rod GR has lateral projections 40 on its periphery, which come to meet stop parts 41 that are placed on the (otherwise flat) lower surface of the upper tie plate and may be welded on or formed on. As a result, these stop parts form the necessary profile that absorbs the torque occurring when the bush and can are screwed in.

Figure 6:
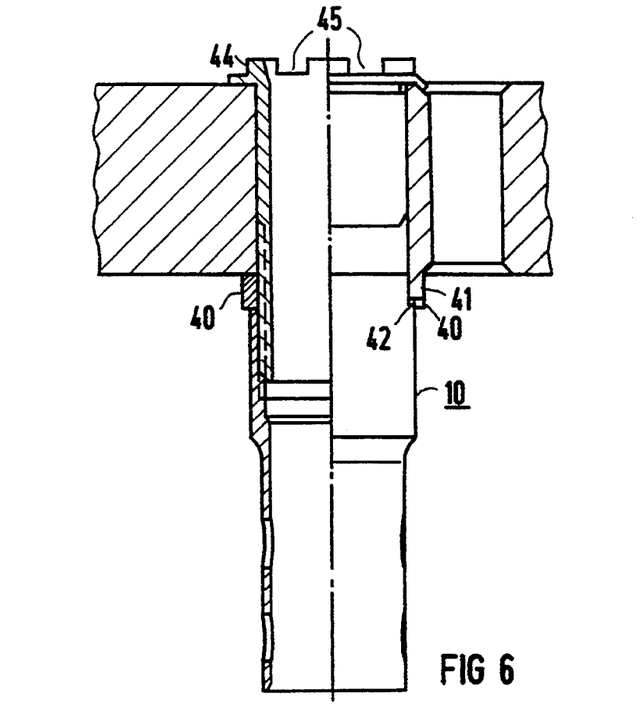

The sectional view of FIG. 6 which is taken along the line VI—VI of FIG. 5 shows that the stop parts 41 can also engage a corresponding groove 42 in the can 10. It can also be seen that a flange 44 fitting into the upper tie plate may have notches 45 formed therein, which serve as engagement surfaces for a turning tool.

Figure 7:
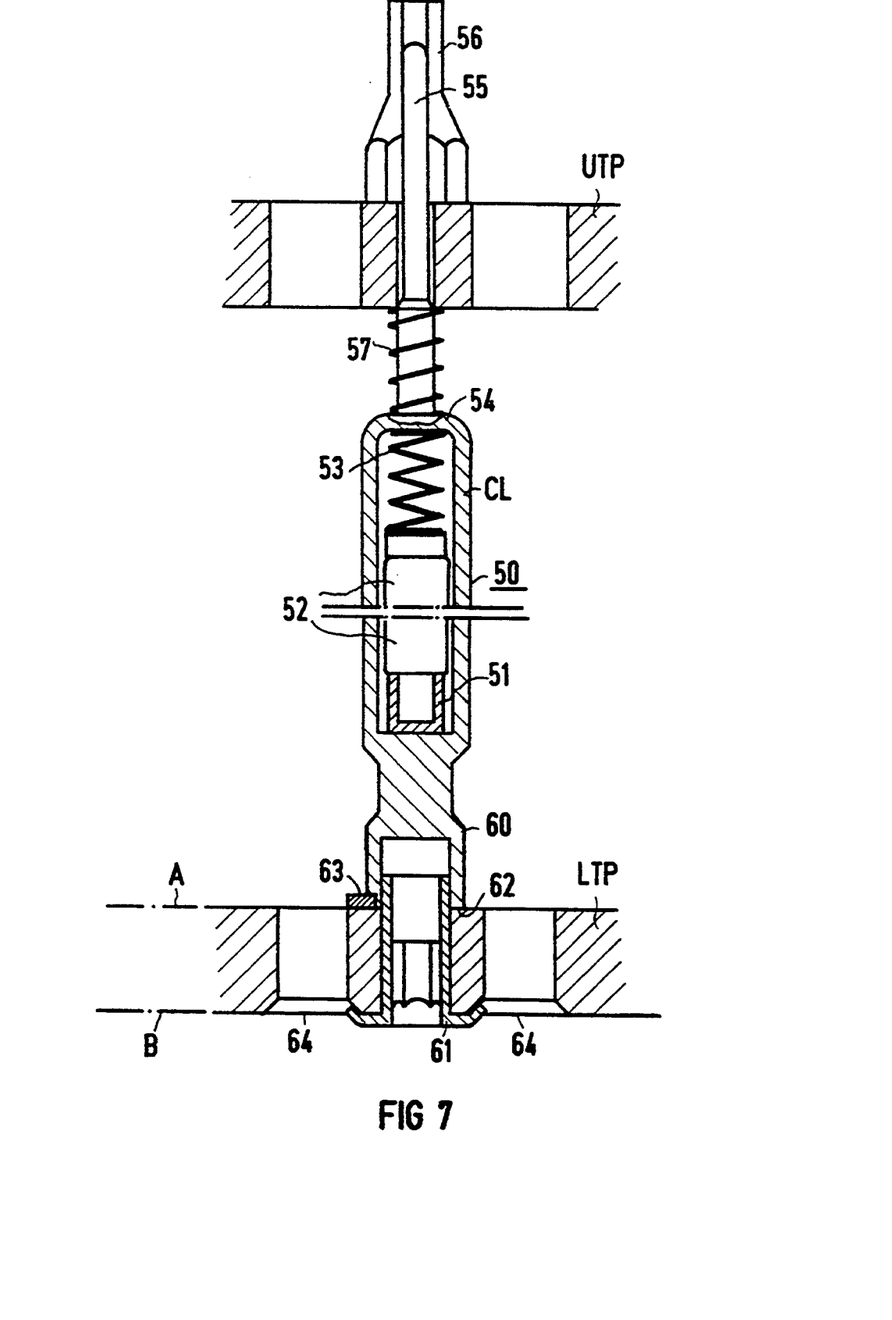
FIG. 7 is a fragmentary, longitudinal-sectional view of a fuel rod of a boiling water fuel assembly, which is screwed on both sides.

FIG. 7 shows a fuel rod 50, which preferably is constructed as a carrying rod. The fuel rod 50 is screwed to the lower tie plate LTP (i.e. the cover plate) in the foot of a boiling water fuel assembly and to the upper tie plate UTP on the other end of the fuel assembly. A cladding tube or cladding CL of the fuel rod is shown partly broken away and illustrates one collecting space each for gaseous fission products. The space is produced by a support body 51 in the lower end of the rod and by a spring 53 in the upper end of the rod, with a column of fuel pellets 52 being disposed between these collecting spaces.

An upper fuel rod end 54 has a pin 55 protruding through the upper tie plate UTP and a stop in the form of a nut 56 is screwed onto this pin. A compression spring 57 presses the upper tie plate against the stop.

A lower end of the tube CL is lengthened by a bush 60 having an end surface 62 which forms a bearing surface resting on the upper surface A of the lower tie plate ("inner surface of the cover plate"). Reference numeral 63 indicates a profile of the bush corresponding to FIGS. 5 and 6 and a corresponding counterprofile on the inner surface of the upper tie plate. These profiles prevent rotation of the bush. This bush 60 also has an internal thread.

A pin 61, which preferably is constructed as a can or a sleeve that is accessible from the outside of the assembly and includes engagement surfaces for an insertable hexagonal socket wrench or other turning tool, reaches through a retaining bore in the interior of the lower tie plate LTP. This pin 61 rests with a flange on the lower surface B of the lower tie plate and has an external thread on the part protruding past the upper surface A.

This pin or can 61 is screwed with the external thread of the pin 61 in the internal thread of the bush 60 until the flange of the pin strikes against the lower surface or outside B and the end surface of the bush 60 strikes against the inside or upper surface A. After this assembly step, the flange is deformed in such a way that it engages a retaining profile on the outside of the lower tie plate, such as a coolant opening 64 adjacent the retaining bore.

This kind of screw fastening, with a continuously open tube secured to the lower tie plate, of the kind described in detail in conjunction with FIGS. 1–6, is especially advantageous if liquid coolant is carried through the lower tie plate and through a coolant tube, which serves as a backbone for a skeleton carrying the fuel rods, into the upper part of a fuel assembly for a boiling water reactor. The small amount of surface area required for the screw fastening makes it possible for relatively small coolant openings, in which foreign bodies (debris) entrained in the coolant flow are caught, to be distributed in a relatively uniform configuration without a notable pressure loss occurring.

I claim:

1. A fuel assembly of a pressurized water reactor, comprising:
   a) a lower tie plate being permeable to coolant;
   b) an upper tie plate having an upper surface, having a practically flat lower surface, having coolant openings formed therein and having a retaining bore formed therein being cylindrical at least in a region thereof between said upper and lower surfaces;
   c) a bundle of fuel rods being disposed next to one another and extending substantially from said lower tie plate to said upper tie plate; and
   d) a plurality of control rod guide tubes each being rigidly retained at said lower tie plate and each having an upper end, a bush on said upper end, and a can being inserted into a retaining bore in said upper tie plate and being screwed to said bush;
   said bush having an end surface forming a flat bearing surface striking said lower surface of said upper tie plate, a profile engaging a counterpart profile of said upper tie plate in a manner secure against twisting, and an internal thread; and
   said can having a flange fitting over said upper surface of said upper tie plate, and a collar protruding beyond said lower surface, said collar having an external thread being screwed into said internal thread of said bush, until said flange strikes said upper surface of said upper tie plate.

2. The fuel assembly according to claim 1, wherein said can has an upper part facing away from said guide tube, said upper part having an inner surface forming engagement surfaces for a turning tool.

3. The fuel assembly according to claim 1, wherein said can and said retaining bore are cylindrical and are surrounded by coolant bores formed in said upper tie plate, and said flange fitting over said upper surface of said upper tie plate engages a retaining profile.

4. The fuel assembly according to claim 3, wherein said retaining profile is at least one of said adjacent coolant bores formed in said upper tie plate.

5. The fuel assembly according to claim 1, wherein said bush is cylindrical, and said profile is formed by at least one upwardly protruding protrusion engaging a groove formed on said lower surface of said upper tie plate.

6. The fuel assembly according to claim 5, wherein said upper tie plate has a groove formed therein joining two coolant bores disposed on both sides of said retaining bore.

7. The fuel assembly according to claim 1, wherein said bush and said guide tube are formed of a zirconium alloy and are welded together with said bearing surfaces of said bushes of all of said guide tubes of one fuel assembly being disposed in a plane being as perpendicular as possible to said fuel rods.

8. The fuel assembly according to claim 1, wherein said upper tie plate is formed of austenitic steel.

9. A fuel assembly for a light water reactor, comprising:
a) an end plate at one end being permeable to coolant;
b) a cover plate at an opposite end having an outer surface pointing outward, an inner surface pointing toward an interior of the fuel assembly, coolant openings formed in said cover plate, at least one retaining bore formed in said cover plate, said retaining bore being cylindrical at least in a region thereof between said outer and inner surfaces, and a counterpart profile;
c) a bundle of tubes being disposed next to one another and having ends, a majority of said tubes containing fuel;
d) at least one bush lengthening the end of one of said tubes and being retained on said cover plate;
e) said bush having an end surface forming a bearing surface disposed on said inner surface of said cover plate, a profile striking said counterpart profile on said cover plate when said bush is turned, and an internal thread; and
f) a pin reaching through said retaining bore and having a flange formed thereon resting on said outer surface of said cover plate, said pin having an end protruding beyond said inner surface of said cover plate, said end having an external thread being screwed into said internal thread of said bush until said flange strikes said outer surface of said cover plate and said end surface of said bush strikes said inner surface of said lower tie plate.

10. The fuel assembly according to claim 9, wherein said flange has engagement surfaces for a turning tool.

11. The fuel assembly according to claim 9, wherein said pin is constructed as a can.

12. The fuel assembly according to claim 9, including a retaining profile engaged by said flange.

13. The fuel assembly according to claim 12, wherein said retaining profile is a coolant opening formed in said cover plate adjacent said retaining bore.

* * * * *